United States Patent
Mathias (10) Patent No.: US 8,281,344 B1
(45) Date of Patent: Oct. 2, 2012

(54) LAN OR WAN REMOTE ACCESS AND MANAGEMENT OF DIGITAL CINEMA SCREEN SERVERS

(75) Inventor: Harry M. Mathias, Thousand Oaks, CA (US)

(73) Assignee: NEC Corporation of America, Irving, TX (US)

( * ) Notice: Subject to any disclaimer, the term of this patent is extended or adjusted under 35 U.S.C. 154(b) by 0 days.

(21) Appl. No.: 12/880,733

(22) Filed: Sep. 13, 2010

Related U.S. Application Data (63) Continuation of application No. 11/257,422, filed on Oct. 24, 2005, now abandoned.

(51) Int. Cl.
*H04N 7/18* (2006.01)
*G06F 15/16* (2006.01)

(52) U.S. Cl. ............ 725/74; 725/78; 725/82; 709/203

(58) Field of Classification Search .................. None
See application file for complete search history.

(56) References Cited

U.S. PATENT DOCUMENTS

| | | | |
|---|---|---|---|
| 6,384,893 B1 * | 5/2002 | Mercs et al. | 352/133 |
| 2002/0122052 A1 * | 9/2002 | Reich et al. | 345/716 |
| 2003/0048418 A1 * | 3/2003 | Hose et al. | 352/123 |
| 2006/0140579 A1 * | 6/2006 | Hsu et al. | 386/52 |

* cited by examiner

*Primary Examiner* — Mark D Featherstone
(74) *Attorney, Agent, or Firm* — Campbell Stephenson LLP (57) ABSTRACT

A method is described that enables a user to remotely manage and/or monitor servers such as digital cinema screen servers and other equipment such as digital projectors within one or more digital multiplex theaters. In one embodiment, the remote management and/or monitoring of the present invention can be performed via a public, wide area network (e.g., the Internet) with or without VPN. In other embodiments, the remote management and/or monitoring of the present invention can be performed via a private, wide area network (WAN), or via a satellite communication link. In yet another embodiment, the remote management and/or monitoring of the present invention can be performed via a local area network (LAN).

7 Claims, 7 Drawing Sheets

LAN OR WAN REMOTE ACCESS AND MANAGEMENT OF DIGITAL CINEMA SCREEN SERVERS

CROSS-REFERENCE TO RELATED APPLICATIONS

The present patent application is a continuation of U.S. patent application No. 11/257,422, filed on Oct. 24, 2005, now abandoned entitled "LAN or WAN Remote Access and Management of Digital Cinema Screen Servers"; which is related to:

U.S. patent application No. 11/257,486 entitled "System And Method For Remote Management And Monitoring Of Multiplex Theater Digital Cinema Operations";

U.S. patent application 11/257,412 entitled "Very High Speed, Multiple Path Failover System For Continuing Digital Cinema Projection Content Availability", and U.S. patent application 11/257,490 entitled "High Speed Transfer Of Movie Files And Other Content Between Shared Storage And Screen Servers To Enhance Content Availability In A Digital Cinema System."

All applications were filed on Oct. 24, 2005, and all are incorporated herein by reference in their entirety.

BACKGROUND OF THE INVENTION

Movies typically are distributed to theaters on heavy reels of film. When received, a set of reels containing a movie is moved to a projector room of a theater, and there the film on the reels is spliced together. Pre-movie content such as advertisements, movie trailers, theater announcements, etc., is also spliced to the movie prior to showtime. Receiving and preparing a movie for presentation is a labor-intensive process.

Movies and pre-movie content can now be distributed and shown in digital format. Digital movies and digital pre-movie content can be stored as files on a disk drive of a computer system (e.g., a server), which in turn is coupled to a digital projector. At showtime, digital content is read from the disk drive and shown on a screen by the digital projector.

As described by S. A. Moreley in "Making Digital Cinema Actually Happen—What It Takes and Who's Going To Do It" (SMPTE 140$^{th}$ Technical Conference, Pasadena, Calif., Oct. 31, 1998), "digital theater" provides capabilities beyond just showing digital movies using digital projectors. More specifically, Moreley describes a simple, graphical user interface which can make screen scheduling in a multi-screen theater (hereinafter a multiplex) easy, accurate, and flexible for a theater manager. Although no specific interface is described, Moreley suggests that by simple drag-and-drop action on a personal computer in the theater manager's office, a movie stored in memory can be scheduled to show at a certain time on a certain screen along with defined pre-movie content. The combination of a movie and defined set of trailers, advertisements, announcements, etc., will be referred to herein as a "playlist." In digital cinema, a playlist is analogous to the final reel of film that a projectionist prepares for presentation, by splicing pre-movie content to a feature movie.

As noted, digital content of a movie is read from the disk drive of a server at showtime and provided to a digital projector. The digital projector, in turn, presents the digital content on a screen within an auditorium. Unfortunately, technical problems associated with the server or digital projector may prevent the presentation of a movie. For example, the server memory that stores the digital content may fail before showtime, a decryption key needed to decode the digital contents of the movie is not available for use, a lamp in the of the digital projector fails while the movie is being presented on the screen, or the digital content of the movie was not loaded onto the server prior to showtime, etc. Technical problems can be fixed by trained technicians, but the trained technicians must have access to the server and/or digital projector in order to diagnose the problem and provide a solution. To gain access to the server or digital projector, the technician must travel to the projector room that contains server and digital projector. The time it takes for the technician to travel to the projector room, adds to the delay in starting the movie or restarting the movie.

SUMMARY OF THE INVENTION

A method is described that enables a user to remotely manage and/or monitor servers such as digital cinema screen servers and other equipment such as digital projectors within one or more digital multiplex theaters, via a wide area network (WAN) and/or a local area network (LAN). In one embodiment, the remote management and/or monitoring of the present invention can be performed via a public, WAN (e.g., the Internet) with or without VPN. In other embodiments, the remote management and/or monitoring of the present invention can be performed via a private, WAN, or via a satellite communication link.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

The present invention enables a user to remotely manage and/or monitor servers and other equipment at one or more multiplex theaters via a LAN and/or a WAN. In the following description, a preferred embodiment of the present invention would ordinarily be implemented as a software program executing on one or more computer systems, although those skilled in the art will readily recognize that the equivalent of such software may also be constructed in hardware. If the invention is implemented as a computer program, the program may be stored in one or more conventional computer readable mediums, that may include, for example: magnetic storage media such as a magnetic disk (e.g., a floppy disk or a hard drive) or magnetic tape; optical storage media such as an optical disk, optical tape, or machine readable bar code; solid state electronic storage devices such as random access memory (RAM) or read-only memory (ROM); or any other device or medium employed to store computer program instructions.

A multiplex theater may include a digital cinema system, which in turn may include a central server, digital projectors, screen servers, shared storage, and one or more LANs. The central server provides many functions, one of which is publishing (i.e.., copying) auditorium schedules and playlists to screen servers for storage therein, copying digital content of playlists or playlist elements to screen servers for storage therein, etc., as will be more fully described below. The central and/or screen servers function according to a digital cinema operating system (e.g., a UNIX based operating system, a Linux based operating system, a Windows based operating system, etc.). The digital cinema operating system is software that can support the copying, loading, scheduling, control, playback of digital content (e.g., digital movies) for subsequent display by digital projectors on respective screens according to playlists set forth in auditorium schedules, etc.

Figure 1:
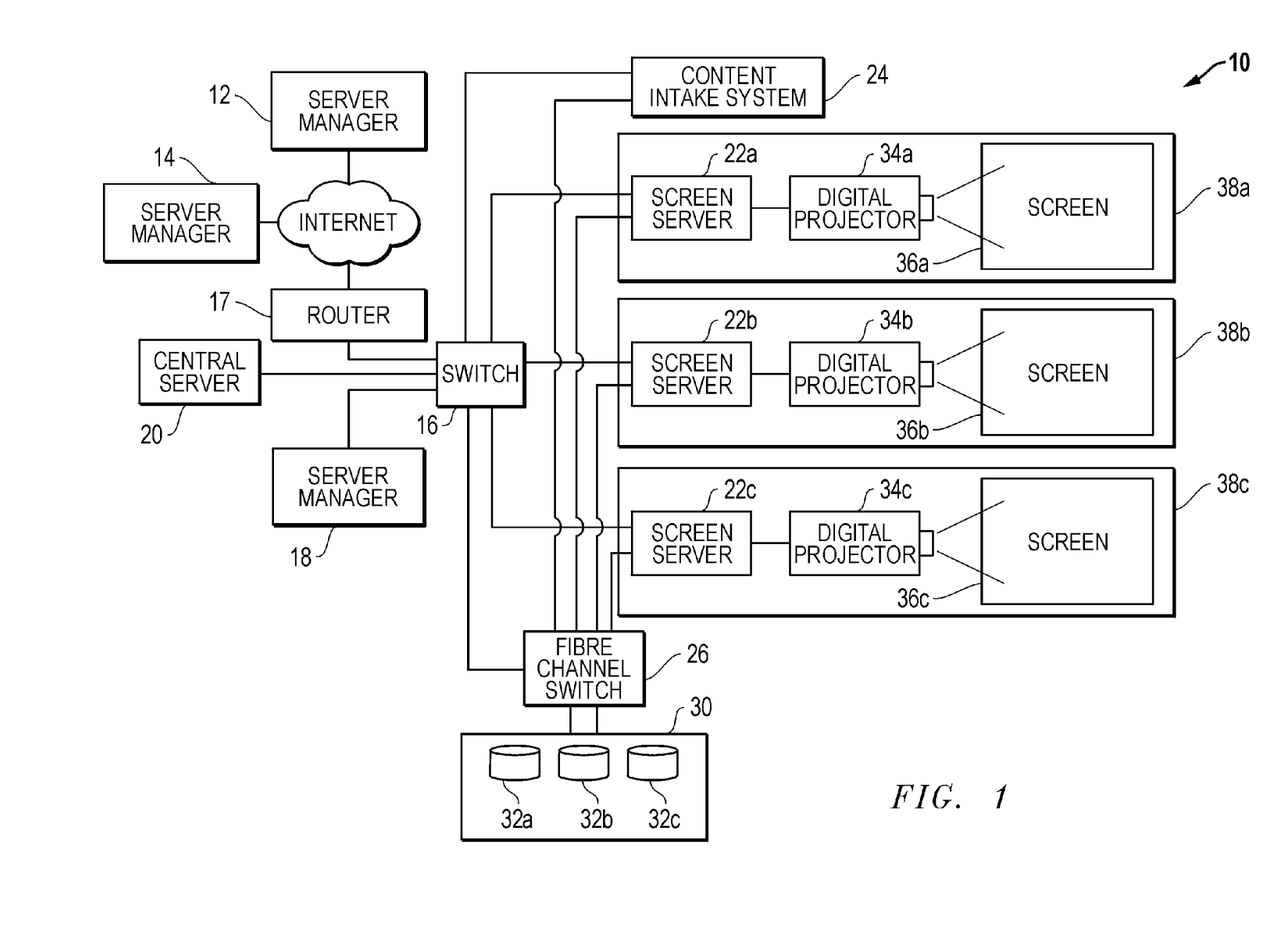
FIG. 1 shows in block diagram form, relevant components of an exemplary digital cinema system employing the present invention.

FIG. 1 shows relevant components of an exemplary digital cinema system 10 employed within a multiplex. The present invention will be described with reference to digital cinema system 10, it being understood that the present invention should not be limited to use with only digital cinema system 10. As shown in FIG. 1, an Ethernet switch 16 enables an Ethernet LAN that couples a central server 20 to a computer system 12 or a computer system 14 via a router 17 and the Internet. The Ethernet LAN also couples computer system 18, screen servers 22a-22c, content intake system 24, and Fibre Channel switch 26 via respective Ethernet communication links. Each of computer systems 12, 14 and 18 may execute software including an operating system (e.g., Windows provided by Microsoft Corporation, Inc.), and each of computer systems 12 and 14 may execute a web browser (e.g., Internet Explorer provided by Microsoft Corporation, Inc.).

Fibre Channel switch 26 couples storage 30 to screen servers 22a-2c and to content intake system 24 via respective optical communication links. Storage 30 may take form in network attached storage (NAS), a storage area network (SAN), etc. The present invention, however, will be described with reference to storage 30 taking form in a SAN, it being understood that the present invention should not be limited thereto. SAN 30 may include several storage units, e.g., disc arrays 32a-32c, that store files that contain the digital content of playlist elements such as movies, trailers, advertisements, etc. SAN 30 may also store playlists, auditorium schedules, etc.

Content intake system 24 caches the digital content of playlist elements received from content providers (e.g., movie studios, movie distributors, etc.) via satellite communication, Internet communication, etc. In one embodiment, the playlist elements are stored in respective caches according to type. For example, the digital content of feature movies can be temporarily stored in a feature movie cache (not shown in FIG. 1), the digital content of movie trailers can be temporarily stored in a movie trailer cache (not shown), etc.

Digital projectors 34a-34c are coupled to screen servers 22a-22c, respectively. Screen server 22a, digital projector 34a, and screen 36a are contained in or associated with auditorium 38a of digital cinema system 10, while screen server 22b, digital projector 34b, and screen 36b are contained in or associated with auditorium 38b, and server 22c, digital projector 34c, and screen 36c are contained in or associated with auditorium 38c. Each screen server 22a-22c includes one or more memories (e.g., a disk drive containing a hard disk) that stores or is configured to store the digital content of one or more playlist elements (e.g., feature movies, trailers, advertisements, announcements, etc.), playlists, and auditorium schedules. As will be more fully described below, auditorium schedules include one or more playlists.

In general, screen servers 22a-22c can automatically control digital projectors 34a-34c, respectively, and other devices (e.g., stage and house lights, curtains, screen masks, audio systems, etc., not shown) in auditoriums 38a-38c, respectively according to playlists contained in auditorium schedules. Screen servers 22a-22c can stream digital content of playlist elements to digital projectors 34a-34c, respectively, according to playlists they run as will be more fully described below. Digital projectors 34a-34 present digital content they receive on screens 38a-38c, respectively.

As noted, digital cinema system 10 is coupled to computer system 12 or computer system 14 via the Internet. Each of computer systems 12 and 14 enables a user to remotely monitor and/or manage central server 20 and screen servers 22a-22c and/or servers (including a central server or screen servers) of another digital cinema system (not shown in the figures) of another multiplex, via a WAN such as, for example, the Internet (a public WAN). Computer system 18 enables a user to remotely monitor and/or manage central server 20 and screen servers 22a-22c via the Ethernet LAN enabled by switch 16. The present invention will be described with reference to computer system 12, it being understood that functions provided by computer system 14 are similar or identical. The present invention will also be described with reference to a user monitoring and/or managing central server 20 and screen servers 22a-22c via computer system 12, it being understood that computer system 12 can be used to remotely monitor and/or manage a central server and screen servers of other digital cinema systems in different cities in similar fashion. While the present invention will be described below with reference to computer system 12 coupled to digital cinema system 10 via the Internet, it should be understood that alternatively computer system 12 enables a user to remotely monitor and/or manage central server 20 and screen servers 22a-22c using a satellite communication link and/or a WAN (e.g., a private WAN owned by a company that also owns a chain of multiplex theaters, each one of which contains a digital cinema system like that shown in FIG. 1) other than the Internet. Further, while the present invention will be described with reference to computer system 12, computer system 18 can provide the same or similar managing and/or monitoring features as provided by computer system 12. As can be appreciated, computer system 18 need not communicate with central server 20 and screen servers 22a-22c via the Internet or router 17 in order to provide the same or similar managing and/or monitoring features as computer system 12. Data and instructions needed to implement the functional features described below, can be transmitted between computer system 18 and central server 20 or screen servers 22a-22c via the Ethernet LAN enabled by switch 16.

Figure 2:
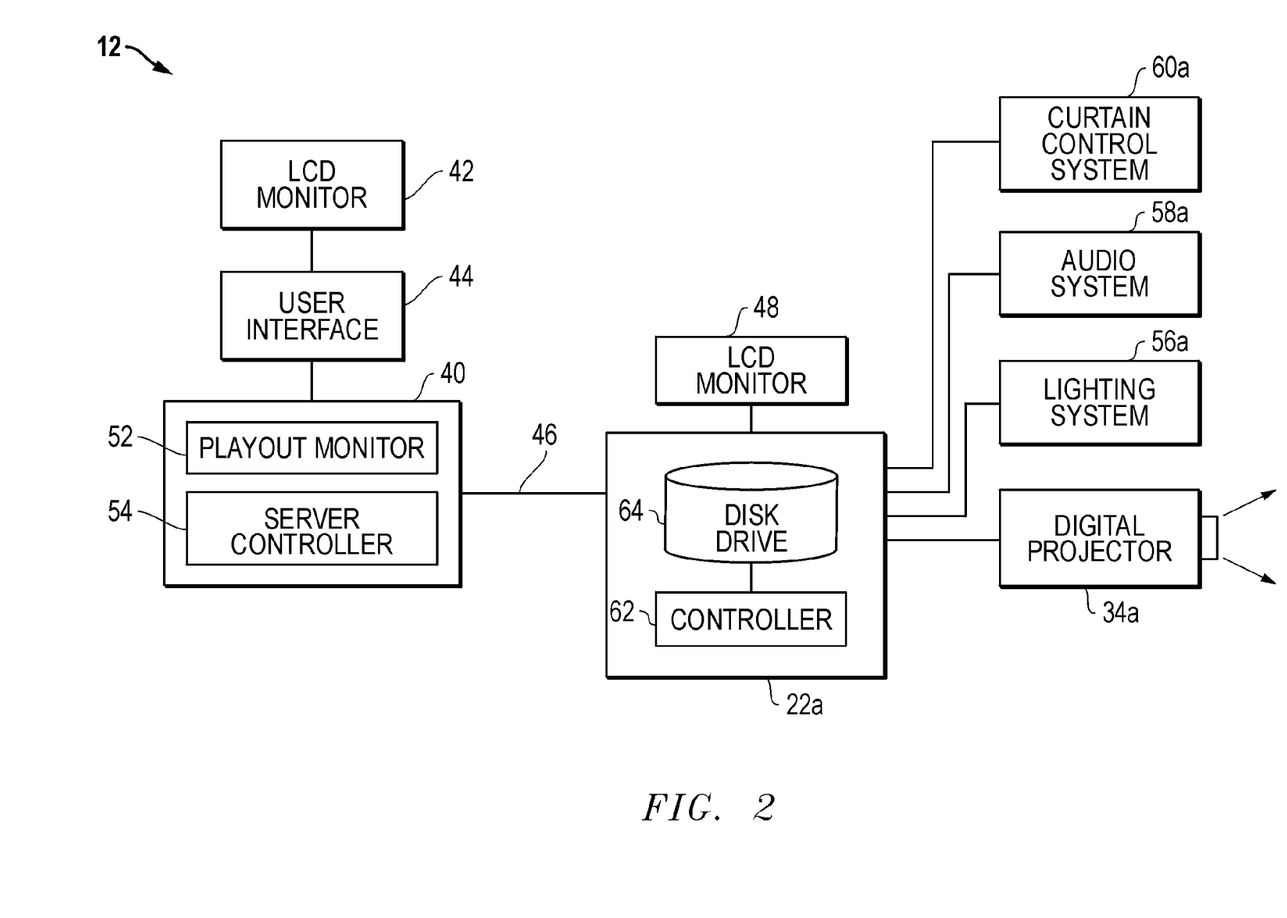
FIG. 2 is a block diagram illustrating relevant components of the digital cinema system of FIG. 1.

FIG. 2 illustrates relevant components of an exemplary computer system 12 coupled to screen server 22a via communication path 46. For purposes of explanation only, the present invention will be described with reference to managing and/or monitoring screen server 22a, it being understood that the present invention could manage and/or monitor screen servers 22b and 22c in similar fashion. Central server 20 could also be managed and/or monitored or managed by computer system 12.

Computer system 12 includes a server manager 40 operable via monitor (e.g., liquid crystal display (LCD)) 42 and user interface 44. Server manager 40 may include functional components such as a playout monitor 52 and server controller 54, each of which may take form in software instructions executing on a processor (not shown) of computer system 12. Computer system 12 may require Java Run Time Engine version 1.4.2 or other Java Run Time Engine versions provided by Sun Microsystems, Inc., in order to execute screen server 40. Java is a computer programming language developed by Sun Microsystems; a future open source version should be available. Java based applications are popular because of their ability to be compiled and run on several different types of computer architectures. In one embodiment, server manager 40 is a Java based web application that can be downloaded to, and run on computer system 12 as a locally-run application. Locally-run applications generally have lower latency, thereby saving the user time, and giving the user a more satisfactory experience. As a web application, server manager 40 reduces system latency otherwise associated with transmitting heavy amounts of data between computer system 12 and screen server 22a.

Playout monitor 52 and server controller 54, in addition to other functional components (not shown) of server manager 40, cooperate with the functional components of screen server 22a in order to provide or implement some or all the functional features generally described herein. The functional features of screen server 22a may take from in software instructions executing on one or more processors. Although the functional components of server manager 40 operate in conjunction with functional components of screen server 22a, the functional features provided by server manager 40 will be described herein with reference to user interfaces displayed on LCD monitor 42.

The communication path 46 of FIG. 2 may include the Internet, router 17, and switch 16. Although the present invention can be employed with only one Ethernet link coupled between screen server 22a and switch 16, the present invention will be described with screen server 22a coupled to switch 16 via first and second Ethernet links (not shown),. Either Ethernet link to screen server 22a may be employed in communication link 46. Each of the first and second Ethernet links may be coupled to respective Ethernet cards (not shown) of screen server 22a. An Ethernet card is an example of a network adapter that enables a device (e.g., screen server 22a) to communicate with other devices (e.g., router 17 or computer system 18) attached to an Ethernet network. Other types of Ethernet adapters can be used in screen server 22a to facilitate communication with computer system 12. In one embodiment, the first Ethernet link is coupled to a peripheral component interconnect (PCI) Ethernet card in a PCI slot of screen server 22a. Screen server 22a may have two, distinct IP addresses, one of which is assigned to the PCI Ethernet card, the other of which is assigned to the Ethernet card coupled to the second Ethernet link. The PCI Ethernet card may include functional components in the form of software executing on a processor. The PCI Ethernet card may include its own power supply that is independent of another supply that powers screen server 22a. Because the PCI Ethernet card has its own power supply, the functional components of the PCI Ethernet card operate when screen server 22a is turned off. As such, the PCI Ethernet card can start or turn on screen server 22a in accordance with an instruction received from server controller 54 as will be more fully described below. A user of server controller 54 can remotely turn on screen server 22a, even though no person is available to manually flip a switch on screen server 22a that turns it on. In one embodiment, all data and instructions can be exchanged between server manager 40 and screen server 22a via the PCI Ethernet card and the first Ethernet link or the other Ethernet card of screen server 22a and the second Ethernet link. For example, server controller 54 may send an instruction to reboot server 22a. PCI Ethernet card may receive this instruction and in response generate a command to reboot server 22a. Or, server controller 54 may send an instruction to mount a disk drive in SAN 30.

For the purposes of explanation only, central server 20 is not included within communication path 46, although it is noted that central server 20 can communicate with server controller 54 in other embodiments. It is noted that when server manager is implemented on computer system 18, communication path 46 includes switch 16 and the Ethernet link between switch 16. In other words, the server manager running on computer system 18, can remotely communicate with screen server 22a, i.e.., without involvement of router 17 or central server 20. Where the communication path 46 includes the Internet, the communication path can be established using a conventional web browser (e.g., Internet Explorer provided by Microsoft Corporation) executing on computer system 12 in one embodiment. However, a web browser is not needed in other embodiments. In another embodiment, server manager 40 provides its functional features even though computer system 12 doesn't employ a conventional web browser. Indeed, a server manager executing on computer system 18 need not be web browser enabled in order to establish a communication path with screen server 22a.

FIG. 2 also shows screen server 22a coupled to digital projector 34a and LCD monitor 48. The combination of screen server 22a, digital projector 34a, and LCD monitor 48 may be contained within a projector room of auditorium 38a. FIG. 2 also shows screen server 22a coupled to curtain control system 60a that includes a motor for opening or closing a curtain within auditorium 38a, audio system 58a that controls speakers within auditorium 38a, and lighting system 56a that control stage and house lights in auditorium 38a. Lastly, screen server 22a includes a controller 62 and disk drive 64, it being understood that screen server 22a includes additional components (not shown).

Controller 62 may take form in instructions executing on one or more processors (not shown) of screen server 22a. Controller 62 provides many functions. For example, controller 62 executes a playlist stored within disk drive 64 at a point in time set forth in an auditorium schedule, also stored in disk drive 64. In response to executing the playlist, controller 62 provides a stream of digital content from disk drive 64 to digital projector 34a. Further, controller 62 generates and transmits commands to curtain control system 60a, audio system 58a, and lighting system 56a, all in accordance with the running playlist. Controller 62 communicates with server manager 40 via communication path 46 in order to exchange data and instructions, as will be more fully described below. Controller 62 is responsible for implementing instructions received from server manager 40. Moreover, controller 62 can generate and display interfaces on LCD monitor 48.

In general, playout monitor 54 of FIG. 2 enables a user to view the status of a playlist that is executing or running on screen server 22a or a playlist that is scheduled to run on screen server 22a. In one embodiment, a playlist is an extended markup language (XML) file or a file that can be read by an executable, it being understood that the term playlist should not be limited thereto. An XML file is generally machine readable and human readable, and contains data as well as metadata. A playlist identifies one, two or more playlist elements (e.g., advertisements, trailers, announcements, feature movies, etc.). A playlist may define the order in which the digital content of the playlist's elements are to be presented. Thus, a screen server can reference a playlist it is running to determine when to provide the digital content of the individual playlist's elements to the screen server's digital projector. Before the scheduled start time of a playlist, central server 20 may copy the elements of the playlist from SAN 30 to disk drive 64 of the screen server 22a. Alternatively, screen server 22a can read the digital content of playlist elements from a disk drive of SAN 30 and subsequently provide the digital content to digital projector 34a if, for example, the disk drive within screen server 22a fails. U.S. patent application 11/257,412 entitled "Very High Speed, Multiple Path Failover System For Continuing Digital Cinema Projection Content Availability" describes an example of this.

A Playlist may also include one or more theater events used by a screen server to control its digital projector and other devices (e.g., lighting system 56a, audio system 58a, etc.). Screen server 22a can also use theater events of a playlist it is running to determine when to generate and send commands to digital projector 34a, lighting system 56a, audio system 58a, and curtain control system 60a. For example, screen server 22a can generate and send a command to adjust the operating mode of digital projector 34a at the appropriate time in accordance with a theater event contained in a running playlist. Different operating modes can be used to account for different playlist element formats. Screen server 22a can generate and send commands to lighting system 56a to dim lights prior to the presentation of a movie in accordance with a theater event contained in a running playlist. Screen server 22a can generate and send commands to audio system 58a to adjust a sound system amplifier and accommodate the acoustics of an auditorium and the type of playlist element being shown in accordance with theater events contained in a running playlist. Screen server 22a can issue commands that cause a motor to raise and lower a curtain at the beginning or end of the playlist in accordance with theater events contained in a running playlist. It is noted that playlist elements may also contain information used by screen server 22a to determine when and how to control components (e.g., projector 34a) in auditorium 38a.

Playout monitor 52 provides many features that enable a user to remotely monitor and/or manage screen server 22a. For example, the playout monitor 52 allows a user to delay the scheduled start of a playlist in auditorium 38a. Playout monitor 52 can alert the user when hardware and/or software failures occur in various components of screen server 22a. Additional aspects and features of the playout monitor 52 will be described below. Importantly, playout monitor 52, and server manager 40 in general, can provide these functional features and others to a user regardless of whether central server 20 is functioning. In other words server manager 40 can function independently of screen server 20. The present invention will be described with reference to server manager 40 monitoring or managing screen server 22a without involving central server 20. In an alternative embodiment, server manager 40 can monitor or manage screen server 22a via central server 20. In this alternative embodiment, sever manager 40 can send instructions to central server 20, and central server 20 in response could send corresponding instructions to screen server 22a in order to implement the instructions sent by server manager 40. Server manager 40 could be a functional component of the multiplex manager described in U.S. patent application 11/257,486 entitled "System And Method For Remote Management And Monitoring Of Multiplex Theater Digital Cinema Operations".

Server controller 54 also provides many features that enable a user to remotely monitor and/or manage screen server 22a or central server 20. For example, server controller allows a user to access and view logs maintained on screen server 22a or central server 20. Log access enables the user to remotely diagnose a problem with screen server 22a or a component (e.g., digital projector 34a) controlled by screen server 22a. Server controller 54 allows a user to remotely turn on screen server 22a, remotely reboot screen server 22a, or remotely run diagnostic software routines on screen server 22a. Additional aspects and features of the server controller 54 will be described below With continued reference to FIGS. 1 and 2, server manager 40, when first initiated, displays a list of servers that it can access, including screen servers 22a-22c and central server 20. Alternatively, screen server manger 40 may initially display a field on monitor 42 into which the user can manually enter the identity of a screen server of interest. Moreover, the user can specify which of the two Ethernet cards within a selected server of interest is to be used in communicating with the selected server. When the user selects a server, server manager 40 establishes a communication path with the selected server such as communication path 46.

After the communication path 46 is established between computer system 12 and screen server 22a, playout monitor 52 or server controller 54 can generate and transmit instructions (e.g. manually start or stop playlists, change digital projector 34a settings, read error log, reboot server, run diagnostics, etc.) to screen server 22a, and screen server 22a can implement those instructions. Screen server 22a can also transmit data back to computer system 12, for example, in response to instructions (e.g., read error log) it receives from playout monitor 52 or server controller 54 for subsequent processing and/or display.

Playout Monitor

Figure 3A:
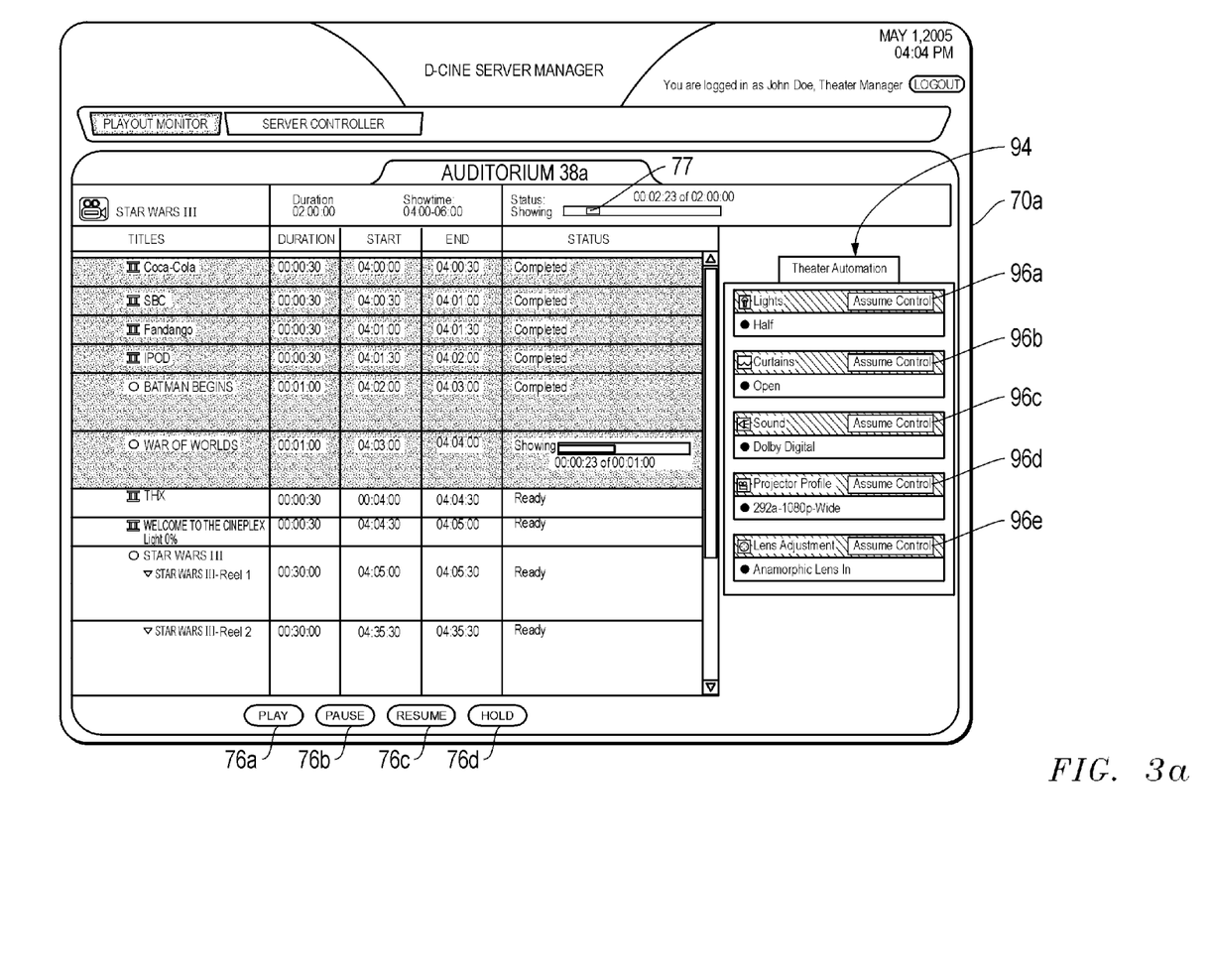
FIGS. 3a-3c illustrate exemplary playout monitor interfaces.

Screen server 22a may initially send playlist status data to playout monitor 52 via the Internet (or via switch 16 only if the user is using computer system 18) when server manager first connects with screen server 22a. Playout monitor 52 can use the data it receives initially from screen server 22a to create a playout monitor interface for display on monitor 42. FIG. 3a illustrates an exemplary playout monitor interface 70a. As an aside, interface 70a may be simultaneously displayed on monitor 48 coupled to screen server 22a, if needed. Moreover, each interface displayed on monitor 42 by server manager 40 or server controller 54, can be simultaneously displayed on monitor 48, if needed. Further, playout monitor 52 will provide a similar playout monitor interface for screen server 22b or 22c on monitor 42 if computer system disconnects from screen server 22a and subsequently connects to screen server 22b or 22c.

Screen server 22a may continue to transmit playout monitor data to computer system 12 to enable playout monitor 52 to update interfaces such as monitor interface 70a as needed. For example, if disk drive 64 fails, which in turn prevents digital projector 34 from showing a scheduled playlist, screen server 22a can transmit a message indicative thereof to playout monitor 52. Playout monitor 52, in response to receiving the failure message, can update monitor interface 70a to identify the failure (e.g., disk drive failure) and its effect (e.g., scheduled playlist cannot start or running playlist interrupted). This concept will be more fully described below.

The functional features of playout monitor 52 will be described with reference to interfaces including monitor interface 70a shown in FIG. 3a, it being understood that the present invention should not be limited thereto. Monitor interface 70a displays the current time (e.g., 4:01 PM on May 1, 2005) and the playlist status for auditorium 38a. The information displayed in monitor interface 70a may have been read from an auditorium schedule and/or other data stored in disk drive 64 and returned to playout monitor 52 in accordance with one or more status information requests received by screen server 22a from playout monitor 52.

Monitor interface 70a, as illustrated, shows the playlist entitled "Star Wars III" is "showing" or running in auditorium 38a. When a playlist or playlist element is being shown, its status state will display as "showing." When a playlist element is showing, a playlist running time (i.e.., 00:02:23 of 02:00:00, the playlist's duration) and playlist time bar 77 can be provided by the interface and updated by playout monitor 52. Before the Star Wars III playlist starts at its scheduled time, monitor interface 70*a* would indicate that the Star Wars III playlist is "ready" to be shown in auditorium 38*a* along with its start time. When the digital content of a playlist is stored on disk drive 64 and is ready to be shown on screen 36*a* in auditorium 38*a*, its status state will be displayed as "ready."

Playlist status states also include "completed," "interrupted," "error," etc. "Error" is a real time status that can be displayed by monitor interface 70*a*. As will be more fully described below, when a playlist is interrupted or cannot start at its scheduled time (e.g., due to a hardware or software failure within screen server 22*a*, or due to general human stupidity), information related to the playlist interruption or inability to start, is transmitted to playout monitor 52, and playout monitor 52 may change the playlist's status on monitor interface 70*a* from "showing" or "ready" to "error" in response to receiving the information from screen server 22*a*. Additionally, as will be more fully described below, monitor interface 70*a* may identify the source of the error from the information provided by screen server 22*a*. For example, monitor interface 70*a* may display a message indicating that playlist Star Wars III cannot or did not start at its scheduled time of 4:00 PM in auditorium 38*a* because of a failure of a light source in projector 34*a*. Lastly, the status of a playlist may be shown in different background colors (e.g., green for "showing," grey for "ready," red for "error," etc.).

Monitor interfaces provide a visual representation of a running playlist or a playlist scheduled to be run, which visual representation includes identities by title of the elements (or theater events) of a running or scheduled playlist. Monitor interface 70*a* identifies by title the elements of the Star Wars III playlist that is showing in auditorium 38*a*. Monitor interface 70*a* shows that the Star Wars III playlist includes four advertisements (Coca-Cola, SBC, Fandango, and iPod), two trailers (Batman Begins, and War of the Worlds), two theater announcements (THX, and Welcome to the Cineplex) and the feature movie (Star Wars III). The playlist elements are displayed by monitor interface 70*a* in the order in which they are played within auditorium 38*a*. Thus, the "SBC" advertisement was immediately shown after the "Coca-Cola" advertisement.

The playlist elements can be displayed in a monitor interface entry, whose vertical width is proportional to the playlist element's duration. For example the vertical width for the Batman Begins trailer element is twice as long as the vertical width for the Fandango advertisement element since the trailer requires twice the time to be shown. Although not shown, monitor interface 70*a* includes a "skip" button associated with each playlist element that, when activated, causes playout monitor 52 to send a skip instruction to screen server 22*a*. The skip instruction identifies the playlist element to be skipped. Screen server 22*a*, in response, skips presentation of the identified playlist element, if the playlist element has not been shown.

Each playlist element is identified with its start time, end time, duration, and status. In one embodiment, playout monitor 52 calculates and displays the start and end times for each playlist element based on the scheduled start time of the playlist, the duration of the playlist element, and the duration of the preceding playlist element(s). The information necessary to calculate playlist element start and end times can be retrieved from playlist metadata entries stored on disk drive 64.

In addition to showing the status of the Star Wars III playlist, interface 70*a* displays the status states for each of the playlist elements. Playlist element status states include completed, showing, ready, interrupted, error, etc. Monitor interface 70*a* could also indicate that one or more elements of a playlist are being transferred to screen server 22*a* from SAN 30 or another screen server. When playlist element is stored on disk drive 64 and is ready to be shown on screen 36*a* in auditorium 38*a*, its status state will be displayed as "ready." When a playlist element is being shown, its status state will display as "showing." Further, when a playlist element is showing, a playlist element running time and playlist element time bar can be provided by the interface and updated by playout monitor 52. Playout monitor interface identifies which element of the playlist is being shown. For example, monitor interface 70*a* shown in FIG. 3*a* indicates that the "War Of Worlds" trailer of the Star Wars III playlist is showing in auditorium 38*a*.

A playlist can be scheduled to start automatically (i.e.., without the need of human intervention) in auditorium 38*a* or manually. Once scheduled, however, the playlist can be switched from automatic start to manual start, or vice-versa, as will be more fully described below. The playout monitor interface can indicate whether a scheduled playlist is set to start manually or automatically. For example, the Star Wars playlist Star Wars III may have been scheduled to start automatically at 4:00 PM. At 4:00 PM, screen server 22*a* will start the Star Wars III playlist and projector 34*a* will begin showing the playlist elements, unless a hardware or software failure prevents the Star Wars III playlist from starting, or unless the user cancels the automatic start of the playlist, as will be more fully described below.

Monitor interface 70*a* can identify the start and end times for a showing playlist or each playlist ready to be shown within auditorium 38*a* according to auditorium schedules, which can be provided by server 22*a* to playout monitor 52 and subsequently displayed on monitor 42. For each playlist showing or ready to be shown, the playout monitor interface can display the run time and/or running time (i.e.., the time that has passed since the start of a currently showing playlist). For example, monitor interface 70*a* indicates that playlist Star Wars III in auditorium 38*a* has a run time of two hours from start to finish. Monitor interface 70*a* also indicates a running time of 2 minutes, and 23 seconds has passed since the start of Star Wars III playlist in auditorium 38*a*. Further, monitor interface 70*a* can provide a horizontal time bar 77, the length of which is proportional to the displayed running time. For example, time bar 77 provides a visual indication that less than a quarter of the Star Wars III playlist has been shown. Playout monitor 52 updates the time bar and running time as the corresponding playlist is shown, unless the playlist is interrupted by the user or interrupted due to a failure of, for example, digital projector 34*a*.

Before the scheduled start of a playlist, a playout monitor interface does not provide a running time or time bar. Rather, a countdown timer can be displayed that indicates the amount of time before the scheduled start of the playlist. This is true regardless of whether the playlist is scheduled for automatic or manual start. Before the scheduled start of the Star Wars III playlist, monitor interface 70*a* showed a countdown timer indicating the time remaining until start. When the countdown timer reached zero, the countdown timer was replaced by time bar 77, assuming screen server 22*a* sends a confirmation to playout monitor 52 that the Star Wars III playlist has actually begun. Similarly, when a user manually starts a playlist (either before or after the scheduled start time) by clicking a Play button (more fully described below), the countdown timer may be replaced by a time bar and a running time. However, the countdown timer is not replaced with a running time and horizontal time bar at the point in time when the countdown timer reaches zero for a playlist that is scheduled for manual start.

A playout monitor interface enables a user to remotely (or locally via computer system 18) control screen server 22a. For example, the playout monitor interface can provide a buttons that allows a user to (1) remotely interrupt a showing playlist, (2) remotely resume the showing of an interrupted playlist either at the beginning or at the point in time where the playlist was interrupted, (3) remotely cancel the automatic start of a scheduled playlist, or (4) manually and remotely start a playlist that is ready to be shown. A playout monitor interface may also indicate that the scheduled start of a playlist has been delayed, or the playout monitor interface may indicate that a showing playlist has been interrupted, for example, because of hardware failure in a screen server that is running the playlist or a digital projector that is showing the digital content of the playlist.

Monitor interface 70a shows exemplary control buttons 76a-76d. When a playlist is running on a screen server and its digital content is being shown, a user can remotely interrupt the running playlist using pause button 76b. For example, if the user clicks pause button 76b while the Star Wars playlist is showing, playout monitor 52 sends a pause playlist instruction to screen server 22a. In response, screen server 22a interrupts its currently running playlist. Screen server 22a can send a confirmation message to playout monitor 52 when Star Wars III has paused. Playout monitor 52 would update monitor interface 70a when playout monitor 52 receives this confirmation massage. In particular, playout monitor 52 could change the status of playlist Star Wars III from showing to ready (or "interrupted") on monitor interface 70a in addition to freezing the playlist's running time and horizontal time bar.

A user can resume an interrupted playlist using resume button 76c. For example, after interruption of Star Wars III described above, the user could click resume button 76c, which in turn causes a resume instruction to be sent to screen server 22a. In response, screen server 22a resumes executing the Star Wars III playlist, and digital projector 34a resumes showing Star Wars III on screen 36a at the point where the playlist was interrupted. Screen server 22a would send a confirmation signal to playout monitor 52 after Star Wars III successfully resumed. Playout monitor 52 could then update monitor interface 70a. In particular, playout monitor 52 could change the status of Star Wars III back to showing on monitor interface 70a in addition to unfreezing the running time and horizontal time bar, all in response to receiving the confirmation from screen server 22a.

In an alternative embodiment, when the resume button 76c is clicked, playout monitor 52 could present a dialog box (not shown) on monitor 42 that enables the user, in essence, to rewind the playlist to a point before the playlist was interrupted. The rewind feature could be useful in a situation where, for example, the lamp in digital projector 34a fails as it is presenting the Star Wars feature movie on screen 38a. In this exemplary situation, screen server 22a unwittingly continues to stream the digital content of the feature movie to projector 34a for several minutes after lamp failure, but before the lamp failure is noticed by the user of playout monitor 52. Once the user notices the lamp failure, the user can interrupt the Star Wars III playlist using the pause button 76b as described above. After the lamp in projector 34a is replaced, the user can click the resume button 76c. In this alternative embodiment, the above mentioned dialog box is displayed on monitor 42 in response to the user clicking the resume button, and the dialog box can include a field into which the user enters a restart time. Preferably, the restart time is several minutes prior to the frozen, playlist running time displayed by interface 70a and earlier than the time of the lamp's failure. Alternatively, the user could enter an amount of time the user wants screen server 22a to "rewind" the digital content of the feature movie from the point the user interrupted it. The user then clicks a commit button of the dialog box, and playout monitor 52 sends a rewind-and-resume instruction to screen server 22a, which includes the restart time entered by the user or, alternatively, a restart time calculated by playout monitor 52 from the amount of the time (entered by the user) the user wants screen server 22a to rewind and the point in time (e.g., the frozen running time) at which the user interrupted the feature movie. Screen server 22a, in response, digitally rewinds the Stars Wars III feature movie to a point corresponding to the restart time of the rewind-and-resume instruction. In one embodiment, screen server 22a uses a file offset value (see, e.g., U.S. patent application 11/257,412 entitled Very High Speed, Multiple Path Failover System For Continuing Digital Cinema Projection Content Availability) to determine the next address in a feature movie file where data should be read and subsequently presented to digital projector 34a. This offset value would be frozen to a value corresponding to the point in time at which the user interrupted the Star Wars III feature movie. Screen server 22a could implement a digital rewind operation by resetting the offset value for the Star Wars III movie to a value that corresponds to the restart time of the rewind-and-resume instruction, it being understood that the present invention should not be limited thereto. After screen server digitally rewinds the feature movie, screen server 22a resumes running the Star Wars III playlist, and the audience in auditorium 38a will see the portion of the feature movie they missed after the lamp failed. Screen server 22a can also send a confirmation signal to playout monitor 52 after Star Wars III successfully resumes. Playout monitor 52 could then update monitor interface 70a by changing the status of Star Wars III back to showing on monitor interface 70a in addition to unfreezing the running time and horizontal time bar, all in response to receiving the confirmation from screen server 22a. The running time, however, would be reset to the restart time entered by the user into the dialog box or otherwise calculated by playout monitor 52, before playout monitor 52 unfreezes the running time.

A user can remotely cancel a scheduled automatic start of a playlist within an auditorium using the hold button 76d. To illustrate, presume the Star Wars III playlist was set for automatic start at 4:00 PM. Before 4:00 PM, the user clicked hold button 76c, and in response playout monitor 52 would send a cancel instruction to screen server 22a. In response to receiving the cancel instruction, screen server 22a would cancel the automatic start of Star Wars III. After cancellation, the playlist would not show in auditorium 38a until screen server 22a receives a subsequent start or play command from playlist editor 52. In effect Star Wars III is rescheduled to start manually. Screen server 22a can send a confirmation signal to playout monitor 52 after the automatic start of playlist Matrix II was switched to manual start. Playout monitor 52 could update monitor interface 70a when playout monitor 52 receives this confirmation from screen server 22a. In particular, playout monitor 52 could update monitor interface 70a to indicate that Star Wars III is now in manual start mode. Playout monitor 52 may let the countdown timer for Matrix II count down to zero after cancellation of an automatic start.

In another embodiment, when the user clicks hold button 76c playout monitor 52 may display a dialog box (not shown)

on LCD monitor 42. The dialog box may include one or more fields into which the user can enter related information. For example, the dialog box may include a field into which the user enters a reason for canceling the automatic start of a scheduled playlist or the interruption of a currently showing playlist. The reason could be selected from a drop down menu containing a list of common reasons. The dialog box can also include a commit button. Playout monitor 52 can transmit the information (e.g., the reason the automatic start of the movie has been cancelled) entered into one or more fields of the dialog box to screen server 22a when the user clicks the commit button. This transmitted information can subsequently be stored by screen server 22a in an appropriate file for future reference. The cancel instruction mentioned above may be transmitted to screen server 22a only after the commit button of the dialog button is clicked. Although not shown, monitor interface 70a may display information (e.g., the reason the automatic start of the playlist has been cancelled) entered into the dialog box.

A user can manually start a playlist that is ready to be shown in an auditorium using play button 76a. For example, the user can manually start the Star Wars III playlist using play button 76a, before or after the countdown timer for Star Wars III has expired, regardless of whether the playlist was scheduled for automatic or manual start. The user can click the play button 76a, which in turn causes a play instruction to be sent to screen server 22a. In response to screen server 22a receiving the play instruction, screen server 22a begins running the Star Wars III playlist. Screen server 22a may send a confirmation signal to playout monitor 52 when the playlist has successfully started. Playout monitor 52 could then update monitor interface 70a when playout monitor 52 receives this confirmation from screen server 22a. In particular, playout monitor 52 changes the status of Star Wars III from ready to showing, replaces the countdown timer with a time bar and adds a running timer. .

As noted, a user can manually start a playlist ready to be shown in an auditorium using the play button 76a, before or after the after the countdown timer for playlist has expired. However, if the user does not manually start the playlist when the countdown timer reaches zero for a playlist scheduled for manual start, monitor interface 70a may display a visual indication that the scheduled start of the playlist has been delayed. For example, suppose the Star Wars III playlist is scheduled for manual start. If the user does not manually start Star Wars III via play button 76a when the countdown timer reaches zero at 4:00 PM, playout monitor 52 would update monitor interface 70a by, for example, changing the background color behind the playlist title. In one embodiment, the background color could be changed from grey to bright orange to particularly point out that a playlist was not manually started at the scheduled time.

Failure of hardware or software in screen server 22a or digital projector 34a, can prevent the scheduled start of a playlist, or interrupt the showing of a playlist. If such a failure occurs, screen server 22a can send a message with information indicative of the failure to computer system 12. In response to receiving this message from screen server 22a, server manager 40 can update its monitor interface to warn the user of the failure and/or its effects. To illustrate, presume the lamp in projector 34a fails while the Star Wars III playlist is showing in auditorium 38a. The lamp failure is detected by software within digital projector 34a or by screen server 22a. Information relating to the failure is sent in a message to computer system 12. Failure messages sent by screen server 22a, may include the nature of the hardware or software failure (e.g., lamp failure in projector 34a), the time when the failure occurred. and/or other information. Playout monitor 52, in response to receiving a failure message. can change the playout monitor interface status for the playlist. In the illustrated example, playout monitor 52 could change the status for Star Wars III from "showing" to "error" on monitor interface 70a of FIG. 3a. Further, playout monitor 52 can update monitor interface 70a by displaying the time when the playlist was interrupted, a description of the failure that caused the playlist interruption, and/or the time that has passed from the start of the playlist to when it was first interrupted.

As a further example of the error-reporting nature, suppose disk drive 64 fails just before Star Wars III is scheduled to start in auditorium 38c. Since the disk drive contains the digital contents of the playlist elements, playlist Star Wars III cannot start at its scheduled time of 4:00 PM using failed disk drive 64. Screen server 22a learns of this failure and in response, sends a failure message that includes the time of failure and the nature of the failure (e.g., failed disk drive). Playout monitor 52 in response to receiving the failure message, can update the playout monitor interface accordingly.

FIG. 3a shows an exemplary running time and time bar positioned next to the status state for playlist element "War of the Worlds" trailer that is displayed as showing in auditorium 38a. After a playlist element is successfully shown, its status may change from "showing" to "completed." Monitor interface 70a shows that the first five elements of the Star Wars III playlist have completed (e.g., successfully shown in auditorium 38a).

Screen server 22a can record in memory the current setting or status for each auditorium component (e.g., curtain control system 60a, audio system 58a, lighting system 56a, digital projector 34a, etc.) it controls. When interface 70a is first initiated, playout monitor 52 sends a request for the current settings to screen server 22a. In response, screen server 22a sends playout monitor 54 a copy of the current component settings stored in its memory (e.g., disk drive 64). Playout monitor 52 receives and subsequently displays the settings in theater automation window 94. For example, theater automation window 94 indicates: the lights controlled by lighting system 56a are at 50%; the curtains controlled by curtain control system 60a, are open; audio system 58a is currently employing Dolby Digital (as opposed to Academy Mono); the aspect ratio of digital projector 34a is set to Widescreen (as opposed to Cinemascope), and; digital projector 34a is employing an anamorphic lens (as opposed to not employing the anamorphic lens). Although not shown, theater automation window may display other settings such as: whether projector 34a's dowser control is on or off whether projector 34a's lamp is on or off; where masking for screen 36a is set, etc.

The components in auditorium 38a can change their settings in response to commands they receive from screen server 22a. These commands can be automatically generated by screen server 22a in accordance with executing a playlist (e.g. Star Wars III), or these commands can be generated by screen server 22a after screen server 22a receives corresponding instructions from a user via monitor 70a. Playout monitor 52 updates the displayed a component's setting on interface 70a each time the component's setting is changed. For example if lighting system 56a turns off the house lights in accordance with a command received from screen server 22a, playout monitor 52 changes the displayed status or setting for "lights" from "half" to "off," after playout monitor 52 receives notification of the change in setting from screen server 22a. Screen server 22a may also update the setting it stores in its memory for a component each time screen server 22a receives an acknowledgment from the component that the component's setting has changed.

Window 94 could additionally display errors with components of auditorium 38a. For example, screen server 22a could attempt to change projector 34a's profile from Cinemascope to Widescreen, by sending an appropriate command to projector 34a. Screen server 22a may receive no acknowledgment from projector 34a that the projector's profile was successfully changed, or screen server 22a may receive an acknowledgment from projector 34a that its profile cannot be changed due to a hardware failure. In either case, screen server 22a could send a message to playout monitor 52 that indicates projector 34a's profile cannot be changed due to an error. In response, playout monitor 52 could change the displayed setting or status from "292-1080p-Scope" to "error." Additionally, screen server 22a could also update the projector profile setting it keeps in its memory from "292-1080p-Scope" to "error."

As noted, screen server 22a generates and sends commands to components connected thereto in accordance with a running playlist. For example, when screen server executes the "Welcome to the Cinemaplex" playlist element of Star Wars III. screen server 22a may generate and send a command to lighting system 56a to turn off the house and stage lights since the playlist element indicates that the lights should be set to 0%. When lighting system 56a reduces the lights in response to the command, screen server 22a can send a notification message to playout monitor 52, after screen server 22a receives a successful acknowledgment from lighting system 56a that the lights have been turned off. The notification will indicate that the house and stage lights are set to 0%. Playout monitor 52, in turn, can update window 94. For example, after playout monitor receives notification the stage and house lights are turned off, playout monitor 52 can update window 94 by changing the "lights" setting from "half" to "off."

Interface 70a includes control buttons 96a-96e that enable the user to remotely change the settings of various components (i.e.., curtain control system 60a, audio system 58a, lighting system 56a, digital projector 34a) within auditorium 38a. Control buttons 96a-96e are initially in the "assume" control state. When a control button in the assume state is clicked by the user, play list monitor updates interface 70a to provide optional settings for user selection. For example, presume the user clicks control buttons 96c and 96d while they are in the assume state as shown in FIG. 3a. In response, play list monitor 52 updates interface 70a to provide the interface 70b shown within FIG. 3b. Interface 70b indicates that audio system 58a is currently employing Dolby Digital, but that user can remotely change the audio system setting to Academy Mono. Likewise, interface 70b shown in FIG. 3b indicates that the projector profile of digital projector 34a is set to Widescreen, but can be switched to Cinemascope. Buttons 96c and 96d have also toggled to a "release control" state.

Figure 3B:
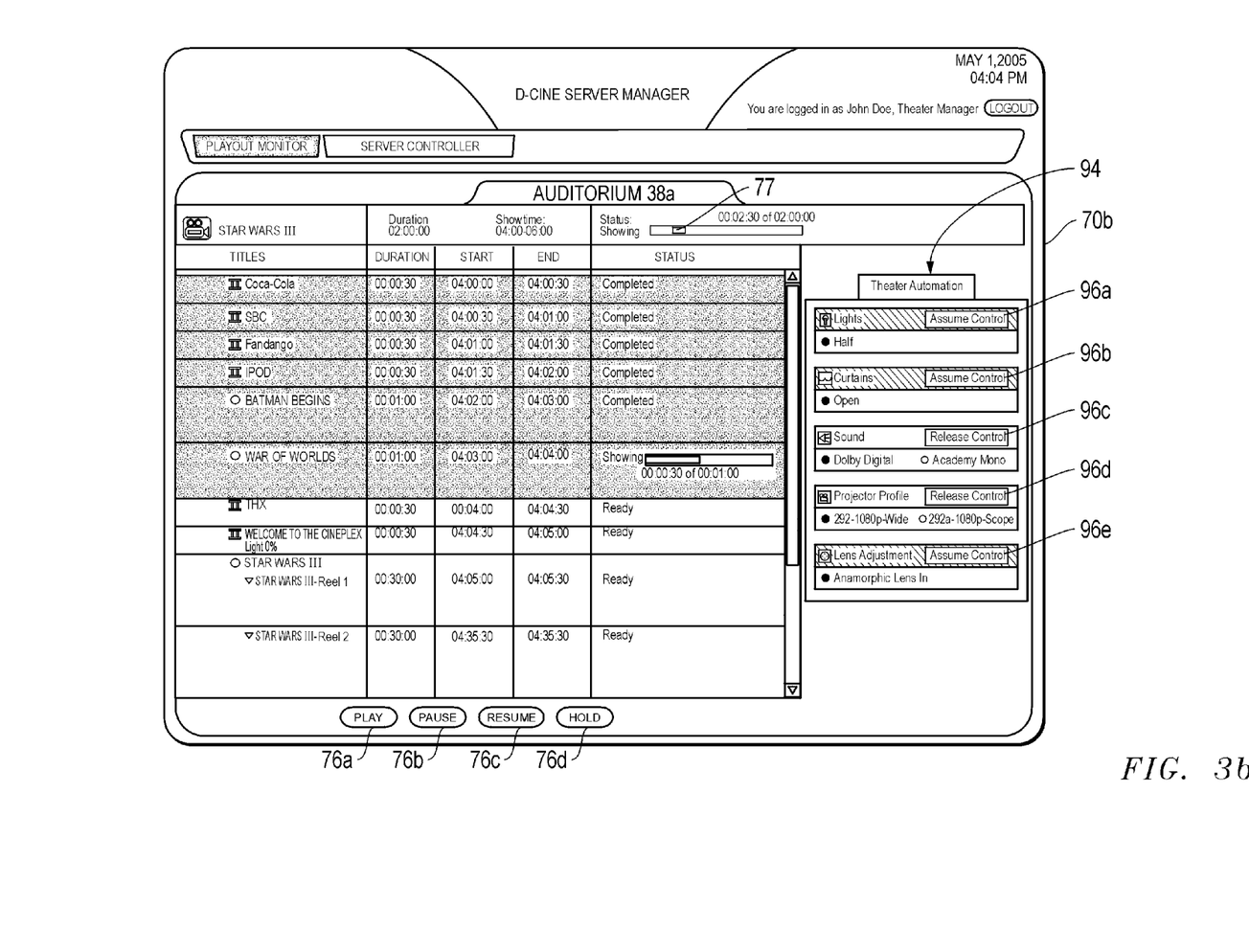

The user can switch the setting of a component within auditorium 38a using the control buttons 96a-96e. For example, the user can switch the setting for the audio system within auditorium 38a from Digital Dolby to "Academy Mono" by first selecting (i.e.., clicking) the Academy Mono option. Additionally, the user can switch the projector profile setting of digital projector 34a from Widescreen (i.e.., 292-1080p-Wide) to Cinemascope (i.e.., 292-1080p-Scope) by first selecting the Cinemascope option setting. When these selections are made, the user can then click control buttons 96c and 96d. Playout monitor 52, in response, sends a pair of instructions to server 22a. The first instruction indicates that the setting of the audio system should be switched to Academy Mono. The second instruction indicates that the digital projector's profile should be switched to Cinemascope.

Figure 3C:
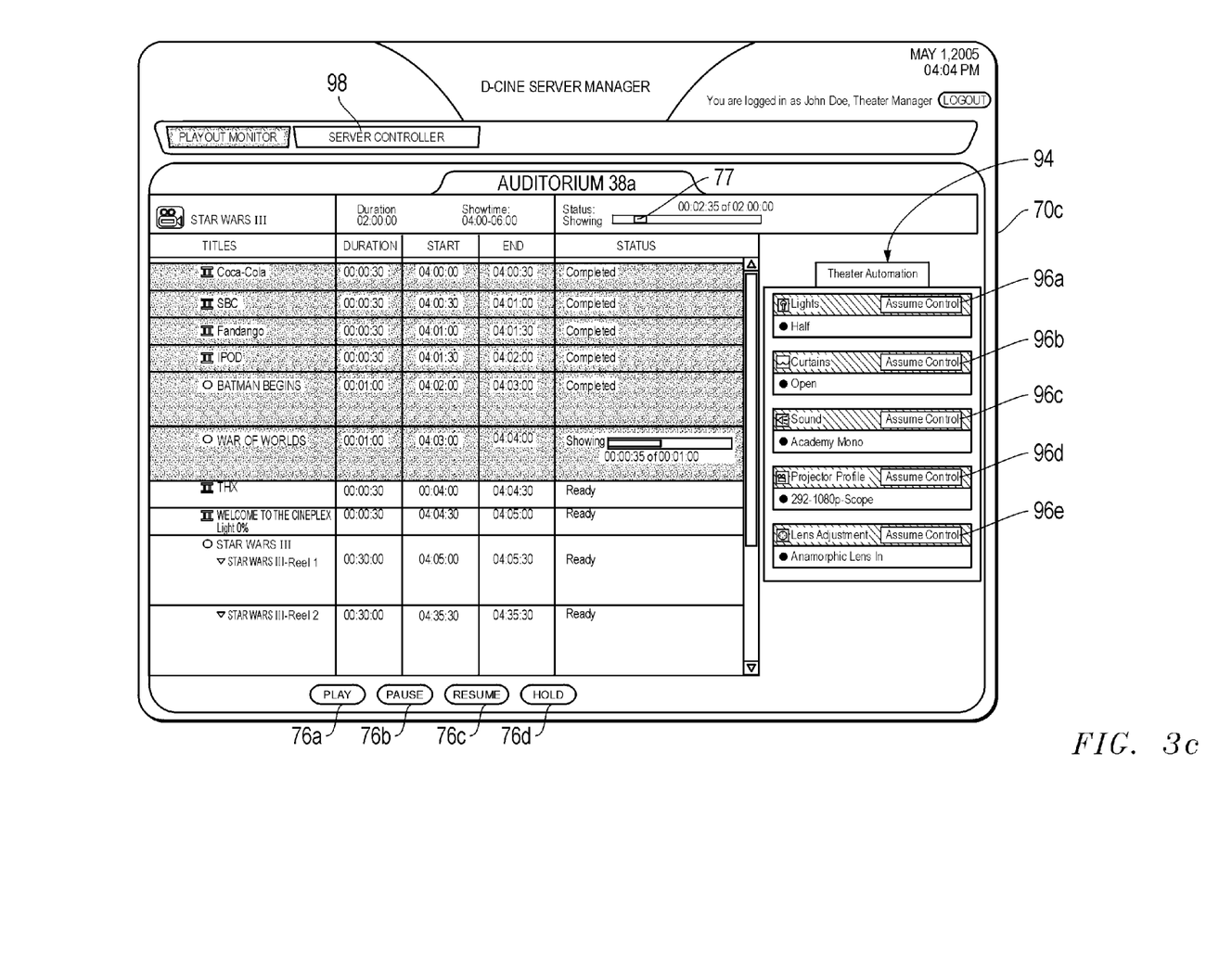

Screen server 22a, in response to receiving these instructions, generates and sends respective commands to audio system 58a and digital projector 34a. More particularly, screen server 22a generates and sends a command instructing audio system 58a to switch to Academy Mono. Likewise, screen server 22 generates and sends a command to digital projector 34a instructing it to change its profile to Cinemascope. If these settings are successful switched, audio system 58a and digital projector 34a will send respective acknowledgments to screen server 22a. Screen server 22a, in turn, will send corresponding messages to playout monitor 54 indicating that audio system 58a is operating in Academy Mono mode and that digital projector 34a is operating in Cinemascope mode. Playout monitor 54 updates interface 70b accordingly to produce interface 70c shown in FIG. 3c. Thus, as shown in FIG. 3c, playout monitor 52 updates window 94 to indicate that audio system 58a is employing Academy Mono and that projector 34a is employing Cinemascope. The state of these control buttons refer back to "assume" control.

Server Controller

Both central and screen server 22a contain operation logs (not shown) that record events as they occur within digital projector 34a or screen server 22a. Further, digital projector 34a or screen server 22a can store an operational log into which events of digital projector 34a are recorded. For example, if the operating temperature of the digital projector 34a exceeds a predetermined value, this event along is recorded in the digital projector's operation log. Digital projector 34a makes notes in its operation log each time an internal system (software or hardware) fails to start properly or each time a system shuts down to protect imaging elements. Digital projector 34a can also note in its operation log each time the projector's internal cooling fan runs too slowly. Digital projector 34a can track the day and time since its light source (i.e.., lamp) was last replaced. At scheduled intervals, digital projector 34a compares the current day and time with the day and time the lamp was replaced. Digital projector 34a may record a note to its operation log indicating its lamp has exceeded its limited life. Digital projector 34a can record each successful boot-up in its operation log. Each event or note recorded in the projector's operation log is time stamped.

Central server 20 or screen server 22a also include an operational log that records events as they occur. To illustrate, digital content of playlist elements are stored on disk drive 64 in encoded format. Screen server 22a includes a decoder (not shown) that uses decryption keys to decode digital content before it is provided to digital projector 22a. Decryption keys are provided to screen server 22a, and typically the decryption keys are provided as useful for a predetermined amount of time. When a playlist element (e.g., a feature movie) is scheduled to be run, screen server 22a attempts to verify that the feature movie's decryption key is correct and valid for the time period in which the playlist element is to be shown. If the key is verified, the key is then provided to and subsequently used by the decoder. Screen server 22a can record events in its operation log when problems arise during verification and decoding of digital content. For example, screen server 22a can note in its operation log each time a playlist element can't be decoded because, for example, the needed decryption key expired or because screen server 22a never received the needed decryption key. Screen server 22a can record in its operation log events that describe the failure of screen server 22a in issuing commands to components (e.g., digital projector 34a, lighting system 56a, audio system 58a, or curtain control system 60a) to open curtains, dim lights, change projector profile, etc. Screen server 22a notes in its operation log each time components return notifications indicating successful or unsuccessful acknowledgments to the commands the components receive from screen server 22a. Screen server 22a can also record events that are associated with the execution of a playlist. For example Screen server 22a can note in its operation log each time a running playlist element is interrupted due to, for example, screen server 22a receiving a hold command or pause command from playlist monitor 52, or due to failure of an internal component such as disk drive 64 or the digital content decoder described above. Screen server 22a may note in its operation log each time it finds a file in disk drive 64 which contains corrupted digital content. The operation log of screen server 22a may record failures to start software or hardware systems contained in screen server 22a. Screen server 22a can record each successful completion of a scheduled playlist to it operation log. Screen server 22a can record each successful or unsuccessful access of disk drive 64 to, for example, load or read a file containing the digital content of a playlist, a playlist or an auditorium schedule. Each event or note recorded in the screen server's operation log is time stamped.

Screen server 22a also maintains a publish log which can be used to record publishing events such as the successful or unsuccessful publishing (i.e., copying) of auditorium schedules, playlists, and digital content to screen server 22a. Thus, screen server 22a may note in its publish log each time screen server 22a successfully or unsuccessfully stores an auditorium schedule, playlist or the digital contents of a playlist element copied onto disk drive 64. An identity of a auditorium schedule (e.g., schedule for auditorium 38a for Jun. 11, 2005), identity of a playlist (e.g., Star Wars III), or identity of a playlist element (starwars3.mpg) along with the time it was successfully or unsuccessfully received, can be stored with each recorded event. The publish log can identify errors such as the failure of screen server 22a to receive or store the digital contents of one or more playlist elements of a playlist after disk drive 64 successfully receives and stores a copy of an auditorium schedule that contains the playlist.

Screen server 22a is capable performing of one or more diagnostic routines to determine if one or more of its systems are operating correctly. For example, screen server 22a includes a diagnostic routine for the decoder mentioned above that, when initiated, tests to see if the decoder is operating properly. In this exemplary routine, an attempt is made to stop and restart the decoder to determine if it is operating properly and capable of receiving digital content of a feature movie from disk drive 64. Restarting the decoder includes loading configuration parameters for the decoder. Each event of an executing diagnostic routine is recorded in the operational log of screen server 22a. For example, each event of the decoder diagnostic routine mentioned above is recorded in the operational log, regardless of whether the event was successful or not. For example, screen server 22a can note in its operational log if the decoder was successfully stopped or not. Screen server 22a can note in its operational log if the decoder configuration parameters were successfully loaded or not, and whether the decoder is correctly configured to decode the digital contents of a feature movie. Screen server 22a may provide a visual indication to a user of the diagnostic routines it runs and the results, event by event, thereof.

Access to the operation logs, the publish logs and the diagnostic routines of screen server 22a is useful in troubleshooting problems or potential problems with screen server 22a or other components within auditorium 38a (digital projector 34a, lighting system 56a, audio system 58a, etc.). The operation and publish logs are typically set up as files in memory of screen server 22a.

A technician can access and view these logs, and use events recorded therein to troubleshoot problems. The diagnostic routines when executed on screen server 22a, can also help a technician in troubleshooting a problem with screen server 22a or digital projector 34a. Server controller operating on computer system 12 or 18 enables its user to remotely access and view the logs on screen server 22a or central server 20. Server controller operating on computer system 12 or 18 also enables its user to remotely start diagnostic routines on screen server 22a or central server 20 and see the results of an executing diagnostic routine, event by event. Server controller 54 also enables a user of computer system 12 to remotely reboot screen server 22a or central server 20 if, for example, is the user of server controller learns that the server is functioning improperly. Server controller 54 also enables a user of computer system 12 to remotely turn on server 22a or central server 20 even though no person is available to manually flip a switch on server that turns it on.

Figure 4:
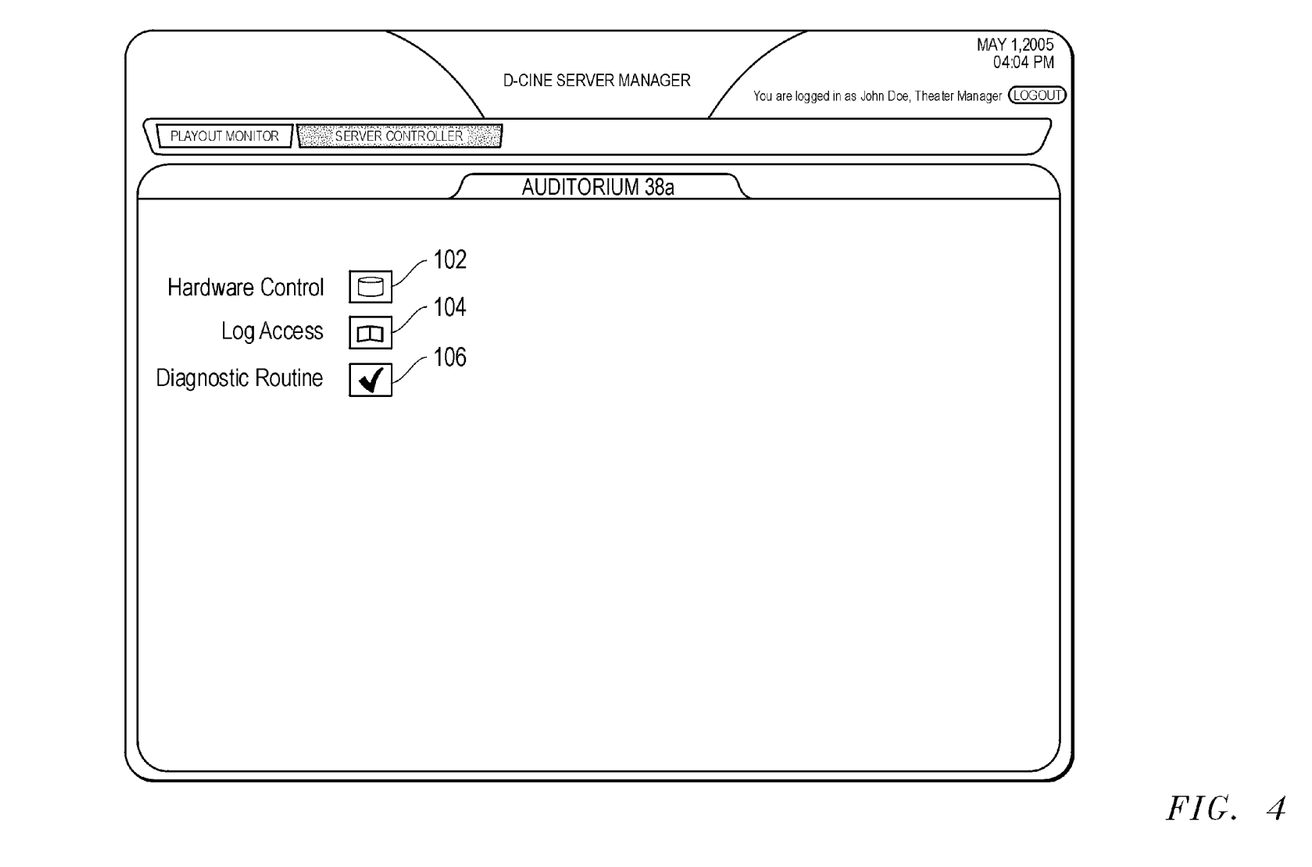
FIG. 4 illustrates an exemplary server controller interface.

Sever controller 54 can be initiated when a user clicks the server controller tab 98 on the playout monitor interface 70a shown in FIG. 3a. FIG. 4 illustrates an exemplary server control interface 100 that is displayed on monitor 42 by server controller 54 when server controller 54 is initiated. Server control interface 100 includes a hardware control button 102, log access button 104, and diagnostic routine control button 106. When a user clicks on, for example, the log access button 104, server controller 54 provides dialog box (not shown) that includes a drop down list of logs (e.g., screen server operational log, digital projector operational log, publish log, etc.) for user selection. Once the user selects the appropriate log and clicks a commit button, server controller 54 sends an instruction to screen server 22a or central server 20 requesting the contents of the log of interest. This instruction may include an identification of the log selected by the user. Server controller 54 will be described with reference to accessing a log or diagnostic routine of screen server 22a, it being understood that server controller 54 can be used to access logs or diagnostic routines of central server, or screen servers 22b or 22b.

In response to screen server 22a receiving a request for access to a specific log, screen server 22a returns to server controller 54, a copy of the events stored in the log identified in the instruction. Controller 54, in response to receiving this data from screen server 22a, generates a log results interface for display on monitor 42. The log results interface displays the events or notes recorded in the selected log of screen server 22a. Further, server controller 54, in one embodiment, periodically (e.g., twice a second) sends an update instruction to screen server 22a requesting a copy of any additional events subsequently added to the selected log. Server controller 54 updates the displayed log results interface using data returned to it in response to these periodically sent update instructions. In this fashion server controller 54 maintains the log results interface as a near real-time view of the contents in the selected log of screen server 22a.

Figure 5:
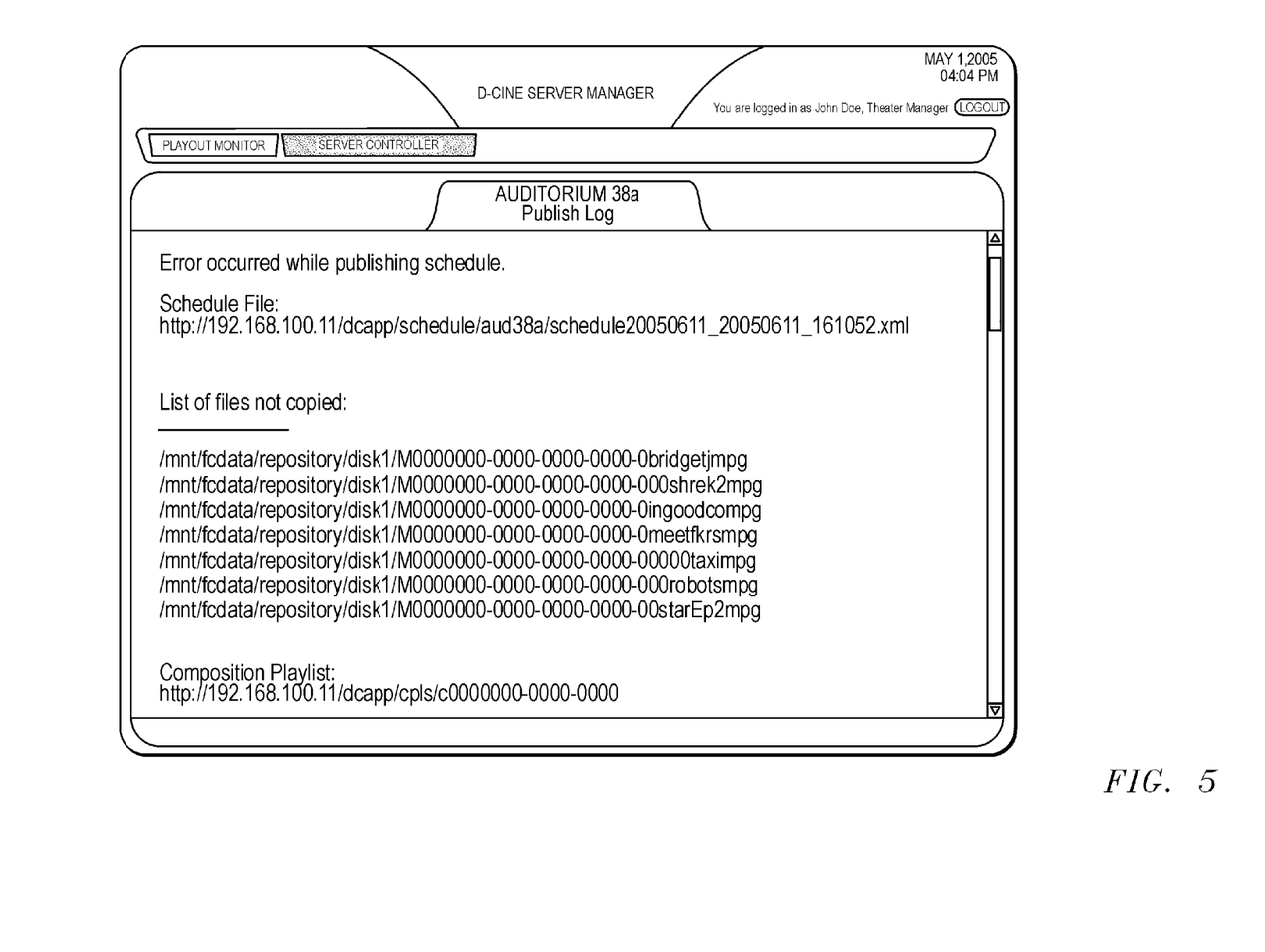
FIG. 5 illustrates exemplary log results interface.

To illustrate, suppose the user wishes to access the publish log within screen server 22a. After activating the appropriate buttons, server controller 54 sends a command to screen server 22a requesting a copy of some or all of the events recorded in its publish log. In response, screen server 22a reads some or all of the contents of its publish log and returns the data to server controller 54. Server controller 54 in response displays the contents of the publish log provided by screen server 22a on monitor 42. FIG. 5 shows a portion of an exemplary log results interface 120 that displays the contents of the publish log provided by screen server 22a.

The log results interface can be used to diagnose problems or potential problems. For example, the log results interface 120 indicates an error. Specifically, the log results interface of FIG. 5 shows that the Jun. 11, 2005 auditorium schedule for auditorium "aud38a" (e.g., auditorium 38a) was successfully received and stored in screen server 22a. However, the log result interface of FIG. 5 shows that the digital content of seven playlist elements needed to implement the schedule, were not successfully received and stored in screen server 22a. The user can see from the log results interface 120 that the missing digital content can be found on disk drive "disk 1" of SAN 30. In response, the user could use the content manager of U.S. patent application Ser. No. 11/257,486 entitled "System And Method For Remote Management And Monitoring Of Multiplex Theater Digital Cinema Operations", and copy the missing digital content from disk drive "disk 1" of SAN 30 to disk drive 64 of screen server 22a. When this action is completed, all digital content needed to implement the June 11, 2005 auditorium schedule for auditorium 38a is available in disk drive 64.

Diagnostic routines, when executed, help a user detect problems with, for example, disk drive 64, the decoder used for decoding encrypted digital content, drivers, etc. A user can remotely start diagnostic routines on screen server 22a or digital projector 34a using the server control interface shown in FIG. 4. More particularly, when a user clicks the diagnostic routine control button 106 of FIG. 4, server controller 54 provides a list (not shown) of diagnostic routines for display on monitor 42 that available to be executed on screen server 22a or digital projector 34a. It is noted that diagnostics routines for digital projector 34a could be a part of its operating system. A user can select to run one of diagnostic routines for screen server 22a by clicking a button next to the diagnostic routine of interest. In response to selecting this button on monitor 44, server controller 54 sends screen server 22a an instruction to initiate the diagnostic routine selected by the user. In response, screen server 22a initiates the selected diagnostic routine, the results of which are copied by screen server 22 to server controller 54. Ultimately, server controller 54 displays on monitor 42, the results of running the diagnostic software routine on screen server 22a as they occur.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a first computer system generating and sending a first instruction to a second computer system via a network, wherein the second computer system is coupled to a digital projector and configured to receive digital content of a playlist, wherein the playlist is running when the second computer system receives the first instruction;
   the second computer system interrupting the running playlist in response to the second computer system receiving the first instruction;
   the first computer system displaying an interface before the first computer sends the first instruction, wherein the interface comprises a first button, a run time that indicates a duration of the playlist, and a running time that indicates an elapsed time of the playlist;
   the first computer transmitting the first instruction in response to user activation of the first button;
   the first computer system generating and sending a second instruction to the second computer system via the network after the first computer system sends the first instruction;
   the second computer system resuming the playlist in response to the second computer system receiving the second instruction;
   the second computer system digitally rewinds the digital content of the playlist to a restart time before the interruption in response to receiving the second instruction;
   the second computer resumes the playlist at the restart time;
   the first computer displaying a dialog box comprising a field into which the restart time can be entered in response to the user activation of the first button.

2. The method of claim 1 wherein the interface comprises a graphical time bar.

3. The method of claim 2 further comprising the second computer system sending a confirmation message to the first computer system via the network in response to the second computer system interrupting the running playlist.

4. The method of claim 3 further comprising the first computer system updating the interface to include a visual indication that the running playlist was interrupted.

5. A non-transitory computer readable medium comprising instructions executable by a first computer system, wherein the first computer system implements a method in response to executing the instructions, the method comprising:
   a first computer system generating and sending a first instruction to a second computer system via a network, wherein the second computer system is coupled to a digital projector and configured to receive digital content of a playlist, wherein first instruction instructs the second computer system to interrupt a running playlist;
   the first computer system displaying a interface before the first computer sends the first instruction, wherein the interface comprises a first button, a run time that indicates a duration of the playlist, and a running time that indicates an elapsed time of the playlist;
   the first computer transmitting the first instruction in response to user activation of the first button;
   the first computer system generating and sending a second instruction to the second computer system via the network after the first computer system sends the first instruction;
   wherein the second instruction instructs the second computer system to resume the playlist;
   the first computer displaying a dialog box comprising a field into which a playlist restart time can be entered in response to the user activation of the first button.

6. The non-transitory computer readable medium of claim 5 wherein the interface comprises a graphical time bar.

7. The non-transitory computer readable medium of claim 5 further comprising the first computer system updating the interface to include a visual indication that the running playlist was interrupted.

\* \* \* \* \*